3,592,889
PROCESS FOR THE PRODUCTION OF AN INTRAMUSCULARLY INJECTABLE IRON PREPARATION FOR ANIMALS
Sven Lindvall and Gustav Högberg, Sodertalje, Sweden, assignors to Aktiebolaget Astra, Sodertalje, Sweden
Filed Dec. 15, 1967, Ser. No. 691,073
Claims priority, application Sweden, Dec. 15, 1966, 17,238/66
Int. Cl. A61k *27/00*
U.S. Cl. 424—147          6 Claims

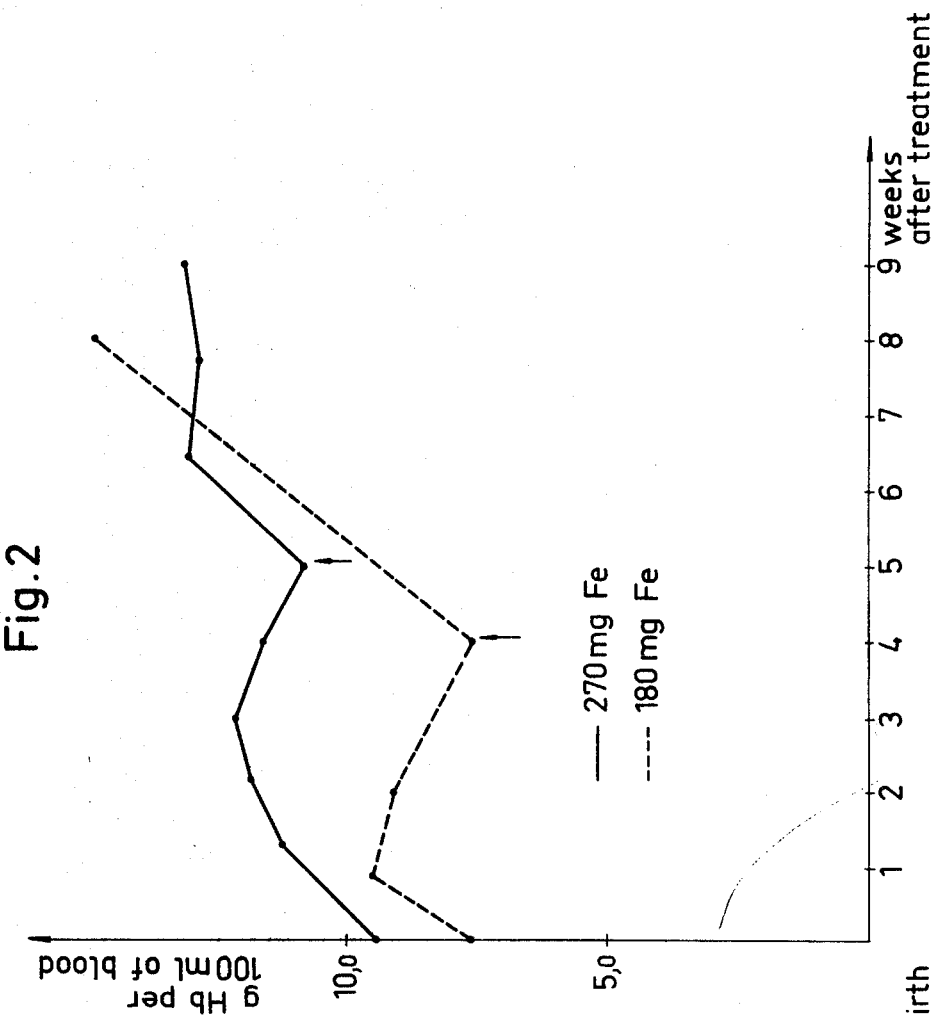
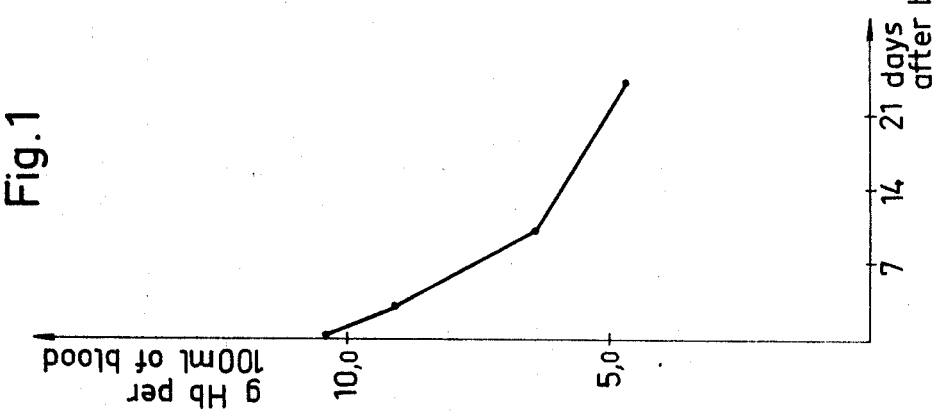

ABSTRACT OF THE DISCLOSURE

A method for combating anemia in piglets is disclosed, characterized by the administration of an iron injection solution containing an iron complex. In the preparation of the injection solution a precipitated complex is first formed by reaction between a soluble ferric salt and lactic acid in the presence of a water-soluble carbohydrate as a dispersion stabilizer. The precipitated iron complex is dispersed in the presence of citric acid and a hexitol such as sorbitol to form an injection solution in which the complex has a molecular weight in excess of 40,000.

---

The present invention relates to an iron preparation suitable for intramuscular injection in animals and to a process for the manufacture of such an article, more particularly, of an iron preparation mainly composed of an iron complex of high molecular weight.

The object of the invention is to increase meat production at pig breed by counteracting at an early stage the development of anemia.

For this purpose it has already been suggested to use intramuscular treatment with an iron-dextrin complex (Andersson N.S.E., Acta med, scand. 138, (1950) suppl. 241, 1–17). However, the known complex has given rise to complications when injected into piglets due to the fact that the complex is toxic when administered in the doses required for adequate treatment. The consequence of this has been the necessity of employing comparatively large injection volumes.

Recently, it has been established that the molecular weight of intramuscularly injectable iron complexes is of great importance with respect to the toxicity and resorption speed. Thus, it has been found that an iron complex with high molecular weight exhibits a lower toxicity and slower resorption than an iron complex with lower molecular weight.

U.S. Pat. No. 3,252,863 describes an iron complex with low molecular weight. This complex is formed from soluble iron, a hexitol and a hydroxycarboxylic acid, and may be stabilized with a watersoluble carbohydrate. Iron complexes, manufactured according to the procedure described in said patent have a sedimentation constant in the order of 14–17 ×10$^{-13}$ sec. (for 90% of the particles), and probable molecular weights not exceeding 5,000. The complex is intended for the treatment of anemia in those occasions at which a dose of 1–5 milligrams Fe per kilogram of body weight can be used and a rapid resorption is desired.

Another still earlier iron complex has been described in German Pat. No. 862,482, using ferric hydroxide as starting material. The resulting product did however, contain iron complexes of widely varying molecular weights since it was prepared first by forming a precipitated iron hydroxide and then breaking that iron hydroxide down by combining it with the complexing agents.

The toxicity of the complexes of this type are sufficiently high, due to the high rate of absorption, that doses of 100–200 milligrams Fe per kilogram body weight, which doses are required for the treatment of anemia in piglets, cannot be administered to the animals. In accordance with the present invention, a stabilized high molecular iron complex has been found which is suitable for veterinary use, especially the treatment of anemia in piglets. By reason of its high molecular weight, and the slower resorption caused thereby, the acute toxicity of the iron complex of the present invention is lower, thereby making it possible to administer the required doses of the preparation to piglets without fear of complications.

The iron preparation according to the present invention may be produced by adding, in portions, a solution of water-soluble ferric salt to a solution of 85–130 milliliters of lactic acid per 100 grams of iron and 200–300 grams of a water-soluble carbohydrate per 100 grams of added iron. The pH of the solution is adjusted after each addition of said water-soluble ferric salt to a value between 4.0–8.0, preferably 6.5–7.6. The ferric colloid thus obtained is precipitated with an organic solvent soluble in water, preferably alcohol (ethanol), and vacuum-dried to obtain a dry preparation for subsequent use.

The iron in the preparation must be in the trivalent form since ferrous compounds do not give the desired stability. For the preparation of the complex the following ferric compounds are suitable: Water-soluble ferric salts, e.g. ferric chloride, nitrate, sulphate, and double salts such for example as ferric ammonium sulphate, as well as their chemical equivalents. The quantity of ferric salt employed is sufficient that the iron content of the dry preparation amounts to about 25%–35%, preferably about 28%, by weight.

As dispersion stabilizers dextrins containing a number of reducing groups corresponding to 40–200 milligrams of glucose, per gram of dextrin are preferred because of their good compatibility in the organism, but other water-soluble carbohydrates may conveniently be used, e.g. glucose, saccharose or low molecular weight dextran fractions.

While the ferric solution is being added to the solution containing the lactice acid and the water-soluble carbohydrate, the latter solution should preferably have a temperature of about 15°–125° C., preferably about 50°–75° C. It will typically have a concentration of from about 1% to about 16%, suitably from about 4% to about 12%, and preferably about 8% by weight of iron (calculated as elemental iron).

The desired injection solution is prepared by dissolving the dried iron precipitate in a solution of citric acid and a hexitol component, such as sorbitol, to form a polydispers colloid in which at least 50% of the molecules have a molecular weight of 40,000 or more. Suitable hexitol-components are sorbitol, mannitol, dulcitol, iditol and hydroxypropyl sorbitol.

The dry preparation is added to a solution containing 520 grams of citric acid per liter of the injection solution and 50–150 grams of a hexitol component per liter of the injection solution, in such quantities that the iron content of the finished injection solution may amount to not more than about 110, preferably about 100, milligrams of Fe per milliliter. The amount of iron is normally at least 20 milligrams per milliliter to avoid excessive injection volumes.

The solution containing the citric acid and a hexitol component should, while the dry preparation is being added, suitably have a temperature of about 15°–125° C., preferably about 50°–70° C. The dry preparation having been added to the solution, the pH of the solution is adjusted to 5.0–8.0, preferably 6.0–6.7, before the solution is sterilized.

The invention will be more fully explained hereinafter, reference being made to the examples to follow.

EXAMPLE 1

A solution containing 672 grams of ferric chloride ($FeCl_3 \cdot 6H_2O$) dissolved in 900 milliliters of distilled water was added in 8 portions to a solution containing 324 grams of dextrin, 150 milliliters of lactic acid, and 180 milliliters of an alkali solution. The alkali solution used in the example was prepared by dissolving 450 grams of NaOH dissolved in 2,250 milliliters of distilled water. After each addition of the ferric chloride solution, the reaction mixtures was neutralized with 180 milliliters of the alkali solution while being stirred. The temperature of the mixture is kept at 60° C. by heating in a water bath. After the ferric chloride addition was completed, the pH of the mixture was adjusted to 7.1 by adding a further quantity of the alkali solution and after maintaining the mixture at 60° C. an additional 65 minutes, it was cooled to 30° C. and diluted with distilled water to a volume of 5,400 milliliters.

The ferric colloid thus obtained was precipitated while stirring the solution by adding 21.6 liters of diluted ethyl alcohol (5 parts of 99.5 percent alcohol+1 part of distilled water) and the precipitate thus obtained was filtered off after 2 hours. The precipitate was purified by redissolving it in a lactate solution which had been heated to 60° C. The lactate solution for this purpose was prepared from 150 milliliters of lactic acid and 180 milliliters of the alkali solution in 3,600 milliliters of distilled water. After 25 minutes, when the precipitate was fully dissolved and the pH of the solution amounted to 4.6, the pH was adjusted by means of the alkali solution to 7.2. The solution was heated while being stirred for 50 minutes at 60° C., and was thereupon cooled off to 30° C. while still being stirred.

This solution having been filtered and diluted to 5,400 milliliters, the ferric colloid was reprecipitated, while the solution was being stirred, by adding 21.6 liters of ethyl alcohol (5 parts of 99.5 percent alcohol+1 part of distilled water). The precipitate was filtered off and washed with alcohol for subsequent drying under vacuum at 40°–50° C.

By redissolving the ferric colloid precipitated by the first addition of ethanol in a lactate solution and precipitating, a colloid of improved purity and dispersibility is obtained. This redissolving of the ferric colloid precipitated from a lactate solution may if necessary be repeated several times to improve the purity of the ferric complex.

355 grams of the dry preparation thus obtained were added by portions to a stirred solution at 60° C. of 100 milliliters of sorbitol (ca. 70%) and 17.0 grams of citric acid (monohydrate) in 500 milliliters of distilled water. The temperature of the solution was maintained at 60° C. for 65 minutes. The pH value was then adjusted with the alkali solution referred to above until a pH of 7.7 was obtained. The solution was thereupon diluted to 1,000 milliliters with distilled water, and filtered. The solution was packed in injection ampoules and sterilized at 120° C. for 20 minutes.

The sterilized iron solution has a total iron content of 99.7 milligrams of Fe per milliliter, a pH of 6.3, a viscosity of 17.9 centipoises at 20° C., a freezing point depression of 3.02° C., and a specific weight of 1.230 grams per cc.

In order to determine the molecular size of the iron complex produced according to the invention in relation to dextran with a molecular weight of 40,000, gel-filtering experiments were carried out using Sephadex G 200 (Pharmacia, Uppsala, Sweden) suspended in a 0.9 percent NaCl solution. It was found that over half of the preparation produced in the way set forth in the example occurs in a fraction that passed the gel faster than dextran 40, i.e. the greater part of the complex produced according to the invention has a molecular weight in excess of 40,000.

EXAMPLE 2

51.5 grams of a dry preparation produced according to Example 1 were added by portions while stirring to a solution, at 65° C., of 7.5 grams of mannitol and 3.0 grams of citric acid (monohydrate) in 75 milliliters of distilled water. The temperature of the mixture was maintained at 68°–70° C. for 50 minutes. The pH value was then adjusted with the alkali solution until a pH of 7.5 was finally obtained, the solution being thereupon diluted to 150 milliliters with distilled water and filtered. The solution was packed in injection ampoules and sterilized at 120° C. for 20 minutes.

The sterilized iron solution had a total iron content of 103 milligrams of Fe per milliliter, a pH of 6.0, a viscosity of 16.2 centipoises at 20° C. and a specific weight of 1,270 grams per cc.

EXAMPLE 3

A solution containing 224 grams of ferric chloride ($FeCl_3 \cdot 6H_2O$) dissolved in 300 milliliters of distilled water was added in 8 portions to a solution containing 115 grams of saccharose, 50 milliliters of lactic acid, and 60 milliliters of an alkali solution. The alkali solution used was prepared from 144 grams of NaOH dissolved in 720 milliliters of distilled water. After each addition of the ferric chloride solution, the reaction mixture was neutralized with 60 milliliters of the alkali solution.

During the preparation of the iron colloid, it was continuously stirred and maintained at a temperature of about 60° C. After the ferric chloride addition had been completed, the pH of the mixture was adjusted to 7.6 by means of the alkali solution. The mixture was maintained at a temperature of 60° C. for an additional 90 minutes and then cooled to room temperature and diluted with distilled water to a volume of 1,800 milliliters.

The ferric colloid thus obtained was precipitated, while the solution was being stirred, by adding 7,200 milliliters of diluted alcohol (6,000 milliliters of 99.5 percent ethyl alcohol+1,200 milliliters of distilled water). The precipitate thus obtained was filtered off after 2 day and washed with alcohol of the same concentration as the mother liquor and then with absolute alcohol.

The precipitate was purified by redissolving it in a lactate solution at 60° C. which contained 50 milliliters of lactic acid and 60 milliliters of the above alkali solution in 800 milliliters of distilled water. After 20 minutes, when the substance was fully dissolved, the pH of the solution was 5.1. The pH was adjusted to 7.1 by adding 37 milliliters of the alkali solution. The solution was heated while being stirred for 50 minutes at 60° C., and was thereupon cooled off to room temperature while still being stirred.

This solution was filtered and the ferric colloid was pecipitated once again while the solution was being stirred, by adding 7,200 milliliters of diluted ethyl alcohol (5/1, alcohol/water). The precipitate was filtered off, washed with alcohol of the same concentration as the mother liquor, then with absolute alcohol and dried in vacuum at 40°–50° C.

An injection solution was prepared from the dry ferric colloid in portions to a solution containing 22.5 grams of sorbitol and 2.55 grams of citric acid (monohydrate) in 75 milliliters of distilled water, following the procedure set forth in Example 1. The sterilized iron solution had a total iron concentration of 102.0 milligrams of Fe per milliliter, a pH of 5.5, a viscosity of 3.2 centipoises at 20° C., a freezing point depression of 2.88° C. and a specific weight of 1.196 grams per cc.

In a like manner complexes can be prepared following the procedures described in Examples 1–3, substituting, for example, ferric sulfate, ferric nitrate, and double ferric salts such as ferric ammonium sulfate for the ferric chloride specifically referred to above; substituting low molecular weight dextran particles or glucose for the dextrin or saccharose referred to above; substituting iditol, dulcitol, or hydroxypropyl sorbitol for the mannitol or sorbitol; and/or substituting ammonium hydroxide for sodium hydroxide referred to in Examples 1–3.

EXAMPLE 4

The ammonium hydroxide solution used in the example was composed of 208 milliliters of conc. $NH_4OH$, which was diluted with distilled water to a volume of 500 milliliters.

A solution containing 105.24 grams of ferric sulfate $Fe_2(SO_4)_3 \cdot 6H_2O$) dissolved in 150 milliliters of distilled water was added in 8 portions to a solution containing 54 grams of dextrin, 25 milliliters of lactic acid, and 30 milliliters of the aforementioned ammonium hydroxide solution. After each addition of the ferric sulfate solution the reaction mixture was neutralized with 30 milliliters of the ammonium hydroxide solution while being stirred, the temperature of the mixture being kept at 60° C. by heating in a water bath. The ferric sulfate addition having been complete, the pH of the mixture was adjusted to 7.1 by means of 15 milliliters of a 2-n HCl solution and the mixture, having at first been heated at 60° C. for 65 minutes, was cooled to room temperature and diluted with distilled water to a volume of 930 milliliters.

The ferric colloid thus obtained was precipitated while being stirred with 3,600 milliliters of diluted ethyl alcohol (3,000 milliliters of 99.5 percent alcohol+600 milliliters of distilled water) and the precipitate thus obtained was filtered off. The precipitate was thereupon dissolved in a lactate solution which had been heated to 60° C. and which contained 25 milliliters of lactic acid and 30 milliliters of the ammonium hydroxide solution in 600 milliliters of distilled water. After 20 minutes, when the substance was fully dissolved and the pH of the solution amounted to 4.7, the pH was adjusted by means of 14 milliliters of the ammonium hydroxide solution to 7.0. The solution was heated while being stirred for 50 minutes at 60° C., and was thereupon cooled off to room temperature while still being stirred.

This solution having been filtered and diluted to 900 milliliters, the ferric colloid was precipitated, while the solution was being stirred, by adding thereto 3,600 milliliters of ethyl alcohol (3,000 milliliters of 99.5% ethyl alcohol+600 milliliters of distilled water). The precipitate was filtered off and washed with alcohol for subsequent drying in vacuum at 40°–50° C. The yield was 86.72 grams with a total iron amount of 23.6% Fe. 63.6 grams of the dry preparation thus obtained were added by portions while stirring to a solution having a temperature of 60° C. and containing 13.5 grams of sorbitol and 2.55 grams of citric acid dissolved in 95 milliliters of distilled water, the temperature of the mixture being thereupon maintained at 60° C. for 65 minutes. The pH value was then adjusted with a 1-n sodium hydroxide solution until a pH of 6.55 was finally obtained, the solution being thereupon filtered, and was then dispensed in injection ampoules which were sterilized at 120° C. for 20 minutes.

The sterilized iron solution had a total iron content of 99.5 milligrams of Fe per milliliter, a pH value of 5.45, a viscosity of 32.4 centipoises at 20° C., a freezing point depression of 3.43° C. and a specific weight of 1.254 grams per cc.

For a further understanding of the present invention reference may be made to the following examples of the use of the iron preparation produced as described in Example 1 and the following figures in which FIG. 1 shows the hemoglobin value in the blood of untreated piglets during the first 24 days of life; and FIG. 2 shows the hemoglobin value in the blood of piglets treated in accordance with the present invention during the first 9 weeks of life.

For the tests, 6 farrows of piglets were used all of which were crossbred Swedish Mixed Breed and Yorkshire. During the test period, the animals were kept in stable compartments of concrete, and the milieu was in other respects substantially free of exposed iron. The feeding of the mother sows consisted of 90 percent corn (equal parts of barley and oats) and 10 percent of a commercially available sow food concentrate. The size of the daily food ration was 3 kilos during the gestation period and until 2 weeks after parturition, after which time the feed mixture was increased to .4 kilograms.

Four to five weeks after their treatment with the iron preparation produced according to the invention, the piglets received an iron-containing additional food consisted of 80 percent corn (equal parts of barley and oats) and 20 percent of commercially available young pig food concentrate.

The treatment of the piglets with the preparation according to the invention was carried out by intramuscular injection in the neck region. Before and at different times after the injection, determinations were made of hemoglobin and iron content of serum and iron-bonding capacity, and for this purpose a total quantity of 10 milliliters of blood from the jugular vein was used. For the analysis of the remaining quantity of iron in the muscle, all the muscles at and around the place of injection, at least 100 grams of tissues were used for incineration at different times following the intramuscular administration.

Farrow 1 consisted of 5 animals which were treated 4 days after birth with a dose corresponding to 100 milligrams of iron per 1.5 kilograms of body weight. The average weight was 2.0 kilograms at the time of treatment. Two animals were killed 6 hours and 3 animals were killed 6 days after the injection for the determination of the resorption.

Farrow 2 consisted of 9 animals, which were treated 8 days after birth with the same dose as the first farrow. The average weight was 2.7 kilograms at the time of treatment. For the determination of the resorption, 3 animals were killed after 6 hours, 3 animals after 6 days, and 3 animals after 56 days after the injection, the average weight of the 3 last mentioned animals being 21.0 kilograms.

Farrow 3 consisted of 12 animals which were treated 2.5 days after birth with a dose corresponding to 270 milligrams of iron per animal. The average weight at the time of treatment was 1.8 kilograms. Four weeks later it was 7.4 kilograms and 5 weeks after the treatment it was 8.8 kilograms. For the determination of the resorption, 4 animals were killed 60 days and 5 animals 112 days after the administration.

Farrow 4 consisted of 10 animals of which 3 animals were treated 3 days after birth with a dose corresponding to 270 milligrams iron per animal. The treated animals were killed 28 days after the administration for the determination of the resorption.

Farrow 5 consisted of 7 animals and comprised a control group. The average weight was 1.9 kilograms 3 days after birth and 5.6 kilograms 24 days after birth.

Farrow 6 consisted of 12 animals with an average weight of 1.2 kilograms 8 hours after birth. At that time blood tests were taken from 5 of the animals. (Control group.)

The values of resorption obtained in the tests are shown in the table.

TABLE

| Farrow/n. of animals killed | Age at the time of treatment, days | Time of death, days after treatment | Dose, milligrams of Fe | Milligrams of Fe in the muscles | Resorption, percent | Resorption average value, percent |
|---|---|---|---|---|---|---|
| 1/2 | 4 | ¼ | 140 | 90.1 | 35.6 | |
|  |  |  | 135 | 82.1 | 39.2 | |
| 2/3 | 8 | ¼ | 183 | 115.5 | 36.9 | |
|  |  |  | 147 | 95.5 | 35.0 | |
|  |  |  | 187 | 103.5 | 44.7 | 38.3 |
| 1/3 | 4 | 6 | 135 | 58.5 | 56.7 | |
|  |  |  | 100 | 51.5 | 48.5 | |
|  |  |  | 140 | 63.0 | 55.0 | |
| 2/3 | 8 | 6 | 180 | 67.5 | 62.5 | |
|  |  |  | 187 | 86.5 | 53.7 | 15 |
|  |  |  | 200 | 86.5 | 56.8 | 55.5 |
| 4/3 | 3 | 28 | 270 | 38.0 | 85.9 | |
|  |  |  | 270 | 37.0 | 86.3 | |
|  |  |  | 270 | 42.0 | 84.4 | 85.5 |
| 2/3 | 8 | 56 | 193 | 7.1 | 96.3 | |
|  |  |  | 166 | 5.9 | 96.5 | |
|  |  |  | 180 | 3.2 | 98.2 | 97.0 |
| 3/4 | 2.5 | 60 | 270 | 1.2 | 99.6 | |
|  |  |  | 270 | 3.6 | 98.7 | |
|  |  |  | 270 | 1.9 | 99.3 | |
|  |  |  | 270 | 1.3 | 99.5 | 99.3 |
| 3/5 | 2.5 | 112 | 270 | 1.5 | 99.4 | |
|  |  |  | 270 | 0.9 | 99.7 | |
|  |  |  | 270 | 1.0 | 99.6 | |
|  |  |  | 270 | 1.0 | 99.6 | |
|  |  |  | 270 | 0.5 | 99.8 | 99.6 |

As will be seen from the table, there takes place an immediate resorption of the administered iron, 38.3% thereof having been removed after 6 hours from the place of injection. After this rapid phase of resorption, the rate of resorption slows down, 55.5% of iron having been resorbed after 6 days and 97.0% after 56 days. 16 weeks after the treatment, the remaining iron at the place of injection comprised less than 0.5% of the administered quantity of iron. As will also be seen from the table, the size of the dose does not seem to affect the degree of resorption 8 weeks after the treatment.

The values of hemoglobin obtained from the tests are given in FIGS. 1 and 2, of which FIG. 1 shows the average values pertaining to the control groups (farrows 5 and 6) from the first day of life until the 24th day of life, and FIG. 2 shows the average values from, on the one hand, animals treated with 180 milligrams of Fe (3 animals from farrow 2), and on the other hand, the average values from animals treated with 270 milligrams of Fe (7 animals from farrow 3). In order to facilitate observation of the effect of the injected iron preparation on the hemoglobin values during a prolonged period of time, iron-containing additional food, which is normally given at the age of 3 weeks, was administered not earlier than at the age of 5 weeks (indicated with arrows in FIG. 2).

It will be seen from FIG. 1 that there occurs a continuous lowering of the hemoglobin content in the blood of the untreated animals. Twenty-four days after parturition the animals exhibit a very grave anemia condition with only 4.7 grams of hemoglobin (Hb) per 100 milliliters of blood. The cause of this remarkable decline of the blood value has, inter alia, to do with the fact that a newly born pig will under normal growth conditions double its body weight in about 8 days, resulting in a powerful increase of the blood volume. Generally, Hb values below 9 grams of Hb/100 milliliters of blood are regarded as anemia, a borderline at which it is possible to ascertain clinically that a condition of anemia prevails. Iron deficiency and disturbances of the iron balance occur, however, also at considerably higher Hb values.

As will be seen from FIG. 2, an increase of the hemoglobin content of the blood takes place after the injection of the smaller dose (180 milligrams of Fe per animal) during the first week after the treatment, but after another week the increase in size and the hemoglobin synthesis make themselves felt, resulting in a small lowering of the homoglobin value. This lowering becomes thereupon accentuated with the result that the hemoglobin content in the blood of the animals will have reached a value of about 7.5 grams per 100 milliliters of blood about 4 weeks after treatment.

Following a treatment with the higher dose (270 milligrams of Fe per animal) a continuous increase of the hemoglobin content of the animals takes place until 3 weeks after the treatment despite the great growth and hemoglobin formation. Three weeks after the injection, the Hb value is about 12 grams of Hb per 100 milliliters of blood. The added quantity cannot entirely compensate for the great iron demand existing in the rapidly growing animals. A lowering of the Hb values will therefore come to sight 4 weeks after the treatment, and after 5 weeks the values will have fallen to about 11 grams of Hb per 100 milliliters of blood. After iron-containing extra food is put on, an increase of the hemoglobin content in the blood will occur, resulting in values around 13-14 milligrams of Hb per 100 milliliters of blood being obtained when the animals have reached the age of about 9 weeks.

In general in the practice of this invention, as illustrated by the foregoing examples of the treatment of the new-born piglets, treatment of the piglet will be made sometime during the first seven days of life. The dosage rate is usually from 100 to 300 mg. per kg. of body weight, and is preferably about 200 to about 250 mg./kg.

We claim:

1. A process for preparing a ferric complex in colloidal form suitable for intramuscular injection in piglets comprising:
   (1) preparing a first solution of a water-soluble ferric salt selected from the group consisting of ferric chloride, ferric nitrate, ferric sulfate and ferric ammonium sulfate;
   (2) preparing a second solution of lactic acid as a complexing reagent and a physiologically innocuous water-soluble carbohydrate as a dispersion stabilizer, said carbohydrate being selected from the group consisting of dextrin, glucose, saccharose and lower molecular weight dextran fractions;
   (3) combining said first and second solutions at a temperature between about 15° and 125° C., while concomitantly adjusting the pH of the resulting mixture to between about 4.0 and about 8.0, said solutions being added in proportions to provide between about 85 and about 130 milliters of said lactic acid for each 100 grams of iron, calculated as elemental iron, and between about 200 and about 300 grams of said water-soluble carbohydrate per 100 grams of iron, calculated as elemental iron, the resulting mixture being between about 4 percent and 12 percent by weight iron, calculated as elemental iron, to form a colloidal ferric complex containing about 25 to about 35 percent iron;
   (4) precipitating and drying said ferric complex;
   (5) adding said dried ferric complex to an injection solution at a temperature between about 15° and about 125° C. of from about 5 to about 20 grams citric acid per liter of said solution and from about 50 to 150 grams of at least one hexitol component per liter of said solution, said hexitol component being selected from the group consisting of sorbitol, mannitol, dulcitol, iditol and hydroxypropyl sorbitol, the amount of iron not exceeding 100 milligrams per liter of said solution, and adjusting the pH of said solution to between about 5.0 and 8.0 whereby a polydispersed ferric complex is obtained in which at least 50 percent of the particles have a molecular weight exceeding 40,000.

2. A process according to claim 1, wherein the dried ferric complex, prior to its addition to the injection solution, is purified by dissolving said dried ferric complex in a lactate solution consisting essentially of a salt of lactic acid, with a base selected from the group consisting of alkali metal and ammonium hydroxide, and water at a temperature between about 50° C. and 70° C., the pH of said solution being adjusted to about 6.5–7.6, precipitating and drying.

3. A process according to claim 1, wherein said ferric salt is ferric chloride and said water-soluble carbohydrate is dextrin.

4. A process according to claim 1, wherein said ferric salt is ferric chloride and said carbohydrate is saccharose.

5. A stabilized trivalent iron preparation for intramuscular injection in piglets prepared in accordance with claim 1 in which at least 50% of the particles have a molecular weight exceeding 40,000.

6. A method for improving meat production in piglets comprising intramuscular injection to piglets of a stabilized trivalent iron injection solution in which at least 50% of the particles have a molecular weight exceeding 40,000 and prepared in accordance with claim 1, said solution being injected in an amount effective to reduce the incidence of anemia in said piglets.

References Cited

UNITED STATES PATENTS

| | | | |
|---|---|---|---|
| 2,820,740 | 1/1958 | London et al. | 167—68 |
| 2,885,393 | 5/1959 | Herb | 260—209 |
| 3,070,506 | 12/1962 | Linkenheimer et al. | 167—68 |
| 3,076,798 | 2/1963 | Mueller et al. | 260—209 |
| 3,252,863 | 5/1966 | Lindvall et al. | 167—68 |

OTHER REFERENCES

Veterinary Bulletin (I, II and III), see 3866, 2260, 1432, 1964 and 65.

Lindvall et al.: Brit. J. Pharmacology, vol. 17, pp. 358–59, 1961.

SAM ROSEN, Primary Examiner

U.S. Cl. X.R.

424—176, 180

PO-1050
(5/69)

UNITED STATES PATENT OFFICE
CERTIFICATE OF CORRECTION

Patent No. 3,592,889　　　　　　　Dated July 13, 1971

Inventor(s) Sven Lindvall and Gustav Hogberg

It is certified that error appears in the above-identified patent and that said Letters Patent are hereby corrected as shown below:

Col. 1, line 5, after "and" insert --KARL--.
Col. 1, line 54, "watersoluble" should be -- water-soluble --.
Col. 2, line 47, "lactice" should be -- lactic --.
Col. 2, line 62, "520" should be -- 5-20 --.
Col. 3, line 24, "mixtures" should be -- mixture --.
Col. 4, line 56, "day" should be -- days --.
Col. 4, line 70, "pecipitated" should be -- precipitated --.
Col. 5, line 8, "poiint" should be -- point --.
Col. 6, line 26, "consisted" should be -- consisting --.
Col. 7, line 75, "homoglobin" should be -- hemoglobin --.

Signed and sealed this 28th day of March 1972.

(SEAL)
Attest:

EDWARD M. FLETCHER, JR.　　　　ROBERT GOTTSCHALK
Attesting Officer　　　　　　　　Commissioner of Patents